United States Patent
Blackwell et al.

(10) Patent No.: US 10,983,245 B2
(45) Date of Patent: Apr. 20, 2021

(54) RADIOMETER SYSTEMS AND METHODS

(71) Applicant: Massachusetts Institute of Technology, Cambridge, MA (US)

(72) Inventors: William Joseph Blackwell, Winchester, MA (US); Michael DiLiberto, Belmont, MA (US); James V. Eshbaugh, West Boylston, MA (US); Christopher J. Galbraith, Belmont, MA (US); Steven Gillmer, Somerville, MA (US); Robert Leslie, Billerica, MA (US); Idahosa A. Osaretin, Chelmsford, MA (US); Joseph Racamato, Wakefield, MA (US); Erik M. Thompson, Watertown, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 225 days.

(21) Appl. No.: 16/054,912

(22) Filed: Aug. 3, 2018

(65) Prior Publication Data
US 2019/0204472 A1 Jul. 4, 2019

Related U.S. Application Data

(60) Provisional application No. 62/611,699, filed on Dec. 29, 2017.

(51) Int. Cl.
*G01V 8/00* (2006.01)

(52) U.S. Cl.
CPC .................. *G01V 8/005* (2013.01)

(58) Field of Classification Search
CPC ........................................... G01V 8/005
See application file for complete search history.

(56) References Cited

U.S. PATENT DOCUMENTS

| 4,873,481 | A | 10/1989 | Nelson et al. |
| 5,222,246 | A * | 6/1993 | Wolkstein ............... H03F 3/602 330/107 |
| 5,231,404 | A | 7/1993 | Gasiewski |
| 7,002,511 | B1 | 2/2006 | Ammar et al. |
| 7,603,075 | B2 * | 10/2009 | Barda ................ H04B 7/18528 455/13.1 |
| 2003/0112438 | A1 | 6/2003 | Kuhns et al. |

(Continued)

FOREIGN PATENT DOCUMENTS

EP 0181935 B1 7/1989

OTHER PUBLICATIONS

Blackwell, W. et. al., Lincoln Laboratory; Aug. 8, 2015; "New Small Satellite Capabilities for Microwave Atmospheric Remote Sensing: The Earth Observing Nanosatellite-Microwave (EON-MW)" (Year: 2012).*

(Continued)

*Primary Examiner* — Erin F Heard
*Assistant Examiner* — Donald H B Braswell
(74) *Attorney, Agent, or Firm* — Schmeiser, Olsen & Watts LLP

(57) ABSTRACT

A system may comprise a scanner assembly and a radiometer. The radiometer may comprise a W-Band and F-Band receiver and an intermediate frequency processor. The system may be rotatably mounted to a bus via the scanner assembly.

14 Claims, 14 Drawing Sheets

(56) References Cited

U.S. PATENT DOCUMENTS

2005/0099330 A1* 5/2005 Hausner .................. G01S 7/412
342/22
2012/0038507 A1 2/2012 Werquin et al.
2014/0374616 A1 12/2014 Larussi et al.
2017/0110803 A1 4/2017 Hodges et al.

OTHER PUBLICATIONS

Blackwell, W., et al., "Nanosatellites for earth environmental monitoring: The MicroMAS project," 2012 12th Specialist Meeting on Microwave Radiometry and Remote Sensing of the Environment (MicroRad), Rome, 2012, pp. 1-4, doi: 10.1109/MicroRad.2012.6185263. (Year: 2015).*
Invitation to Pay Additional Fees in PCT/US2018/067663 dated Feb. 14, 2019; 2 pages.
International Search Report & Written Opinion in PCT/US2018/067663 dated Apr. 23, 2019; 13 pages.
Mech, M., et al., "HAMP—the microwave package on the High Altitude and LOng range research aircraft (HALO)," 2014, Atmos. Meas. Tech. 7: 4539-4553.
Chen, Xi and Jianzhong Xu, "Research on Millimeter-Wave Radiation Characteristics of Solid Target," 2013, Progress in Electromagnetics Research 29: 151-164.
International Preliminary Report on Patentability in PCT/US2018/067663 dated Jul. 9, 2020.

* cited by examiner

RADIOMETER SYSTEMS AND METHODS

RELATED APPLICATIONS

This application claims the benefit of the earlier filing date of U.S. Provisional Patent Application No. 62/611,699, filed Dec. 29, 2017 and titled "Ultraminiature Multiband Scanning Microwave Radiometer," the entirety of which is incorporated herein by reference.

GOVERNMENT RIGHTS IN THE INVENTION

This invention was made with government support under NASA Award NNL16AA57I and transferred to U.S. Air Force Contract FA8702-15-D-000, awarded by the U.S. Air Force. The government has certain rights in the invention.

FIELD OF THE INVENTION

The present invention relates generally to systems and methods for a radiometer. The systems and methods for a radiometer may be used for scanning.

BACKGROUND OF THE INVENTION

A satellite may be used to collect atmospheric images at various altitudes. These images may be of hurricanes, cyclones, tropical storms, and other weather systems. Large satellites can be used for weather-related imaging. These large satellites may be expensive and may cost billions of dollars to design and create. Further large satellites may have long development cycles and take years to build. As a result, large satellites may have a high consequence of failure.

Smaller or miniaturized satellites may have size and weight limitations and it may be difficult to incorporate the desired imaging systems (e.g., radiometers), electronics, and other components within small or miniaturized satellites. Further, the imaging systems (e.g., radiometers) used in small satellites may have field-of-view limitations and other limitations. Thus, there may be a need for systems with improved imaging systems and electronics for use in small or miniaturized satellites. Further, there may be a need for methods of using such systems to achieve improved imaging. The improved imaging may provide for more useful images of hurricanes, cyclones, tropical storms, and other weather systems.

SUMMARY

Example embodiments of the present technology include a method determining surface characteristics.

In an embodiment, a system may include a scanner assembly. The system may further include a radiometer. The radiometer may include a W-Band (75-110 GHz) and F-Band (110-140 GHz) receiver. The radiometer may further include an intermediate frequency processor.

One or more of the following features may be included. The system may be rotatably mounted to a bus via the scanner assembly. The scanner assembly may include a motor and a slipring. The W-Band and F-Band receiver may be operable in a frequency range of about 75 GHz to about 140 GHz. The intermediate frequency processor is operable in a frequency range of about 0 GHz to about 28 GHz. The W-Band and F-Band receiver may further include a noise diode. The W-Band and F-Band receiver may also include a noise diode injection block. The W-Band and F-Band receiver may be configured to perform noise diode calibration. The radiometer may further include a G-Band direct detect component operable from about 183 GHz to 206 GHz.

In various implementations, the system may further include at least one of a command and data handling board, a beam focusing antenna, a data interfacing board, a local oscillator, a thermal regulation system, and one or more cables and waveguides. The system may be payload component of a satellite. The satellite may be a CubeSat.

In embodiment, a scanner assembly for a rotating a radiometer may include a motor stator and a motor rotor. The scanner assembly may further include a slipring having a top portion and a shaft. The motor stator and the motor rotor may be configured to produce torque to rotate the motor rotor, the top portion of the slipring, and the shaft.

One or more of the following features may be included. The scanner assembly may rotatably mounts a radiometer to a bus. The scanner assembly is positioned between a bus and a payload of a satellite.

In embodiment, a W-Band and F-Band receiver may include a first portion. The first portion may include a noise diode a coupler, and a low noise amplifier. The second portion may include a tripler configured to triple an oscillator signal, a downconverter, and a voltage regulator The downconverter may be configured to amplify an incoming signal from the low noise amplifier and mix the tripled oscillator signal to produce an intermediate frequency signal. In an implementation, a thermistor in an amplifier bias circuit may be configured to change a bias to maintain an amplifier gain constant with a temperature change.

In an embodiment, an intermediate frequency processor may include one or more power dividers, amplifiers, filters, detectors, video frequency amplifiers, and analog-to-digital converters integrated into a single circuit board, operable in a frequency range of about 0 GHz to about 28 GHz and configured to amplify an input power and divide it into multiple paths.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon showing the principles of the invention.

DETAILED DESCRIPTION

Figure 1:
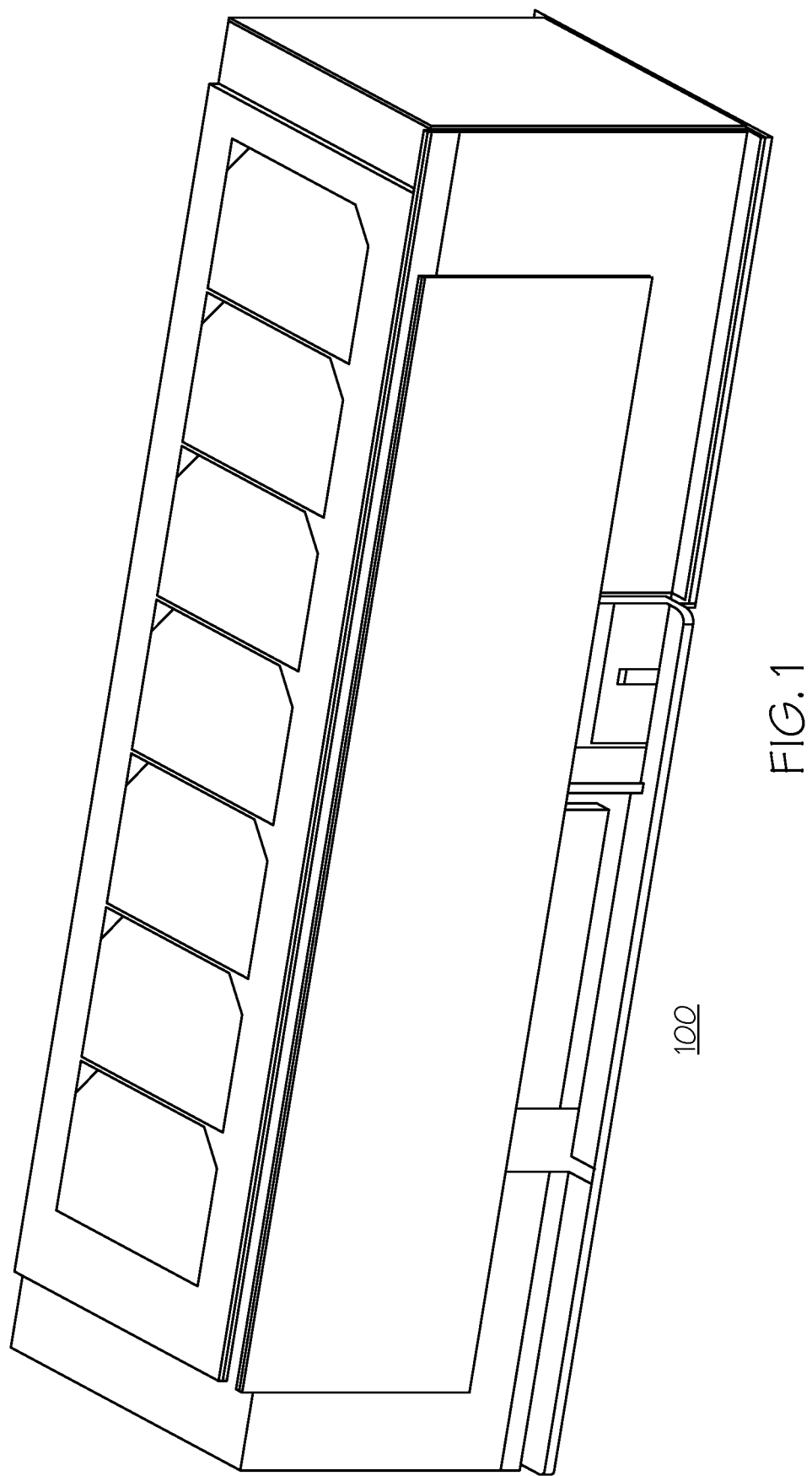
FIG. 1 depicts an example stowed satellite in accordance with the present disclosure.

The techniques and features described in the present disclosure may improve imaging systems and electronics in satellites such as CubeSats and miniaturized satellites and the improved imaging may provide for more useful images of hurricanes, cyclones, tropical storms, and other weather systems. The satellite may be a Micro-sized Microwave Atmospheric Satellite (MicroMAS) which may be used to collect atmospheric images using a miniature passive microwave radiometer payload hosted on, for example, a CubeSat platform. The radiometer may be an Ultraminiature Multiband Scanning Microwave Radiometer (UMSMR) which may be a standalone radiometer that is sufficiently small to permit accommodation on a small satellite platform.

In an embodiment, the satellite may be a dual-spinning CubeSat equipped with a 12-channel passive microwave spectrometer (radiometer) providing imagery near 90 and 206 GHz, temperature sounding near 118 GHz, and moisture sounding near 183 GHz. The CubeSat may include a 2 U spacecraft bus with an Altitude Determination and Control System (ADCS), avionics, power, and communications capabilities. The CubeSat may also include a 1 U spinning radiometer payload with integrated and compact microwave receiver electronics.

The radiometer may rotate to scan a ground-track perpendicular to the satellite's direction of travel. A motor or scanner assembly may facilitate rotation of the radiometer (i.e., the payload) while allowing a spacecraft bus to remain fixed in the local-vertical and local-horizontal frame for increased pointing accuracy. In an implementation, the payload may be included in a standard 1 U CubeSat structure and may occupy one-third of a total vehicle volume of the satellite. Spacecraft support functions may be integrated and maintained in the remaining 2 U volumes as part of a separate bus structure.

Radiance intensity may be measured in approximately 12 channels to permit imaging of the earth's surface, temperature and moisture profiling, precipitation measurement, and tropical cyclone intensity estimation. The radiometer may rotate continuously in either direction to permit raster scanning of an image as the observing platform moves with respect to the earth. The radiometer may include a prime focus paraboloid antenna with 2 feeds. The number of feeds may be minimized while retaining reasonable intermediate frequency (IF) bandwidth. The 12 channels may include 1 W-Band channel, 7 F-Band channels, and 4 G-Band channels. Calibration may be performed via noise diode injection. The entire radiometer may rotate during operation.

The satellite may simultaneously sweep a radiometer field of view perpendicular to a ground-track while maintaining sub-degree pointing accuracy fixed in the local-vertical and local-horizontal frame to collect data with the radiometer sensor. A satellite stabilized in this way may be considered a "dual-spinning" spacecraft.

The radiometer may measure electromagnetic radiation emitted from and scattered and/or absorbed by the atmosphere. The radiation may be incident upon the antenna. A parabolic reflector of the radiometer may focus the energy to feedhorns positioned at the focal point of the paraboloid. A beam (e.g., of radiation) may be split between the two feedhorns using a wire grid polarizing dichroic. The feedhorns may be connected to receivers in the radiometer by waveguide. A noise diode signal may be injected into the front end of one or more receivers for calibration. The receivers amplify the noise diode signal to facilitate the channelizing of the incoming signal, where the power may be divided into predefined spectral bands.

Further, the radiometer may scan across the earth perpendicular to the satellite velocity vector to produce a raster scanned image. The radiometer may also scan across the cosmic background (opposite earth) for a cold calibration point. The noise diode may provide a hot calibration point. A linear relationship derived from the cold and hot calibration points may be used to calibrate the data observed over earth. Temperatures of various parts of the radiometer may be recorded and included in telemetry to aid with calibration. Resulting data may be downlinked to earth for processing.

Referring now to FIG. 1, a satellite 100 in a stowed position in is shown. Satellite 100 may be a CubeSat. A CubeSat may be a miniaturized satellite made up of multiple units. Each unit may be 10×10×10 cubic centimeters and weigh up to 1.33 kg, although other measurements and specifications may be possible. CubeSats may be put into orbit via the international space station or launched via a launch vehicle such as a rocket.

Figure 2:
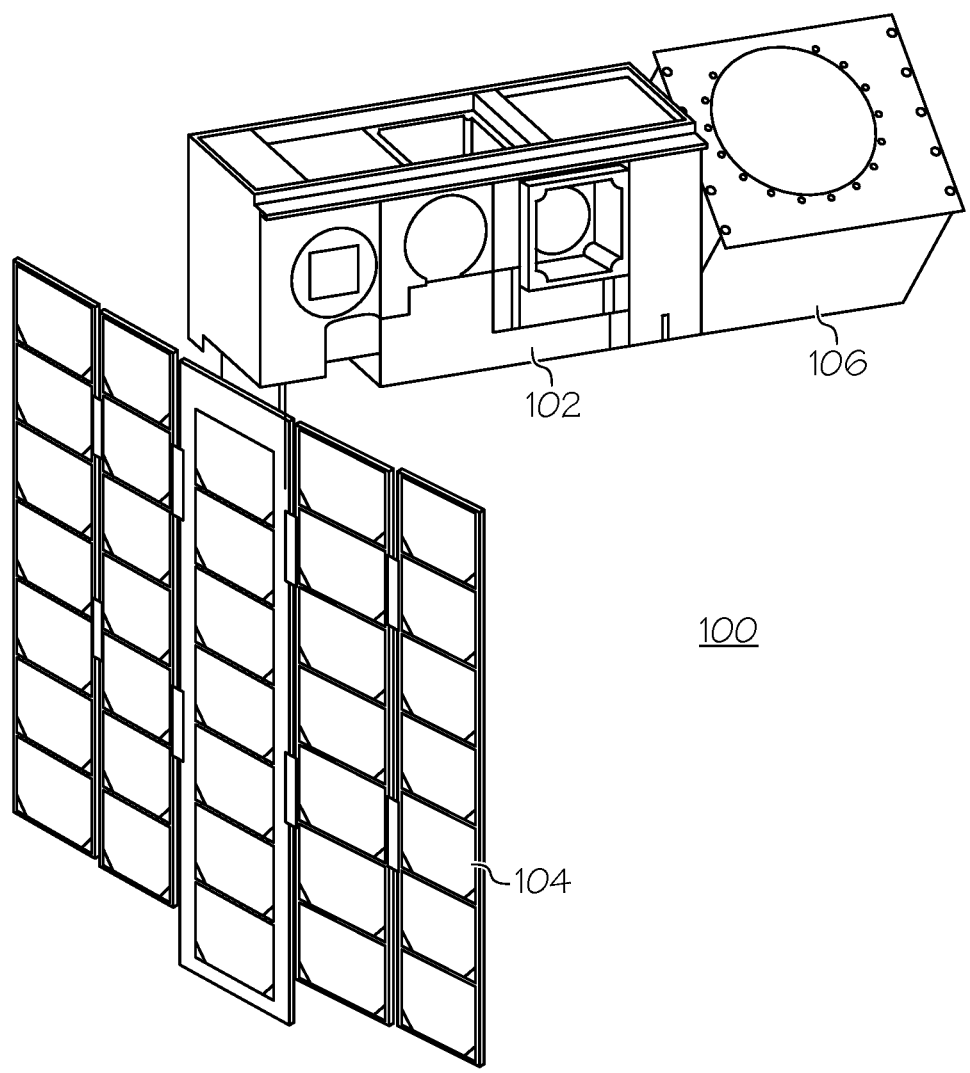
FIG. 2 depicts an example deployed satellite in accordance with the present disclosure.

Referring now to FIG. 2, satellite 100 is shown in a deployed position. The satellite 100 may include a bus 102. The bus 102 may include an ADCS, an S-Band Radio, one or more sub sensors, a star-camera, one or more reaction wheels, and one or more torque rods. Satellite 100 may also include a solar array 104. The solar array 104 may be an articulating solar array and may have multiple panels. For example, solar array 104 may be an articulating 5-panel solar array. Satellite 100 may further include a payload 106. The payload 106 may include a radiometer such as a rotating microwave radiometer and a scanner assembly.

Figure 3:
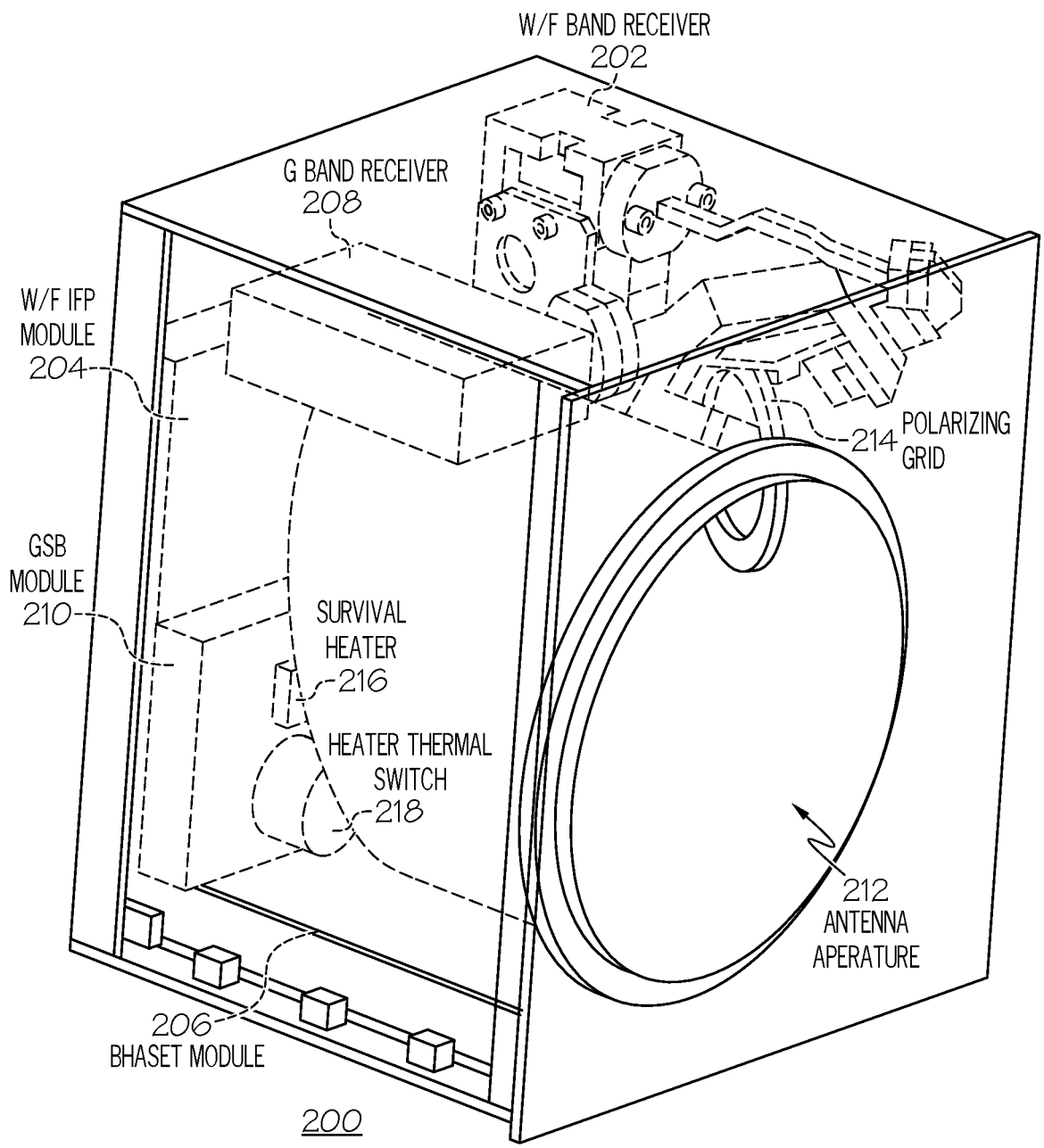
FIG. 3 depicts an example radiometer in accordance with the present disclosure.

An example system in accordance with the present disclosure may include a radiometer such as the radiometer of payload 106. Referring now to FIG. 3, an example radiometer 200 in accordance with the present disclosure is shown. Radiometer 200 may include a W-Band and F-Band receiver 202, intermediate frequency processor (IFP) module 204 (which may include an intermediate frequency processor), board that has everything module (BHASET, also called, command and data handling (C&DH) module) 206, G-Band receiver or detector 208, G-Band signal board (GSB) module 210, antenna aperture 212, polarizing grid 214, survival heater 216, and heater thermal switch 218.

Figure 4:
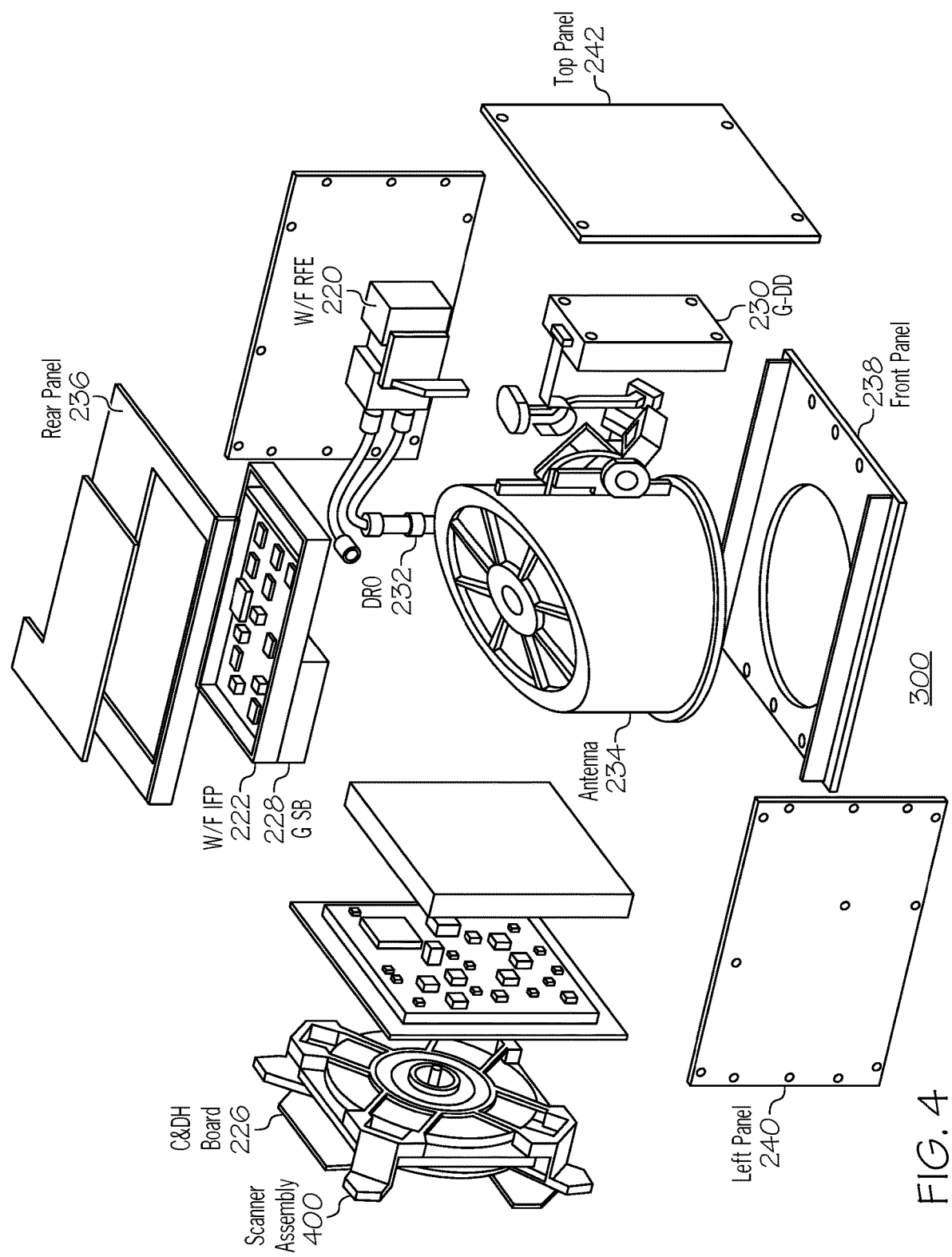
FIG. 4 shows an exploded view of a depiction of an example system 300 showing radiometer components and a scanner assembly in accordance with the present disclosure.

The system may further include a scanner or scanner assembly. In an implementation, the system may be rotatably mounted to a bus (e.g., bus 102) via the scanner assembly. Referring now to FIG. 4, an exploded view of a depiction of an example system 300 showing radiometer components (of, e.g., radiometer 200) and a scanner assembly 400 in accordance with the present disclosure is shown.

The radiometer components (in addition to or in lieu of one or more of the components shown in FIG. 3) may include W-Band and F-Band (W/F) receiver front end (RFE) 220, W/F IFP 222 (which may be the same as or part of IFP module 204), C&DH board 226 (which may be the same as or part of BHASET module 206), GSB 228 (which may be the same as or part of GSB module 210), G-Band direct detect (G-DD) component 230 (which may be a type of G-Band receiver), dielectric resonant oscillator (DRO) 232 (which may provide a local oscillator used by a mixer in the W/F-RFE to mix down the 90-120 GHz RF signal to a DC-30 GHz IF signal), antenna 234, rear panel 236, front panel 238, left panel 240, and top panel 242. Rear panel 236, front panel 238, left panel 240, and top panel 242 may be made from aluminum or other metals and may be located in strategic places to allow access to various components of the radiometer.

Figure 5:
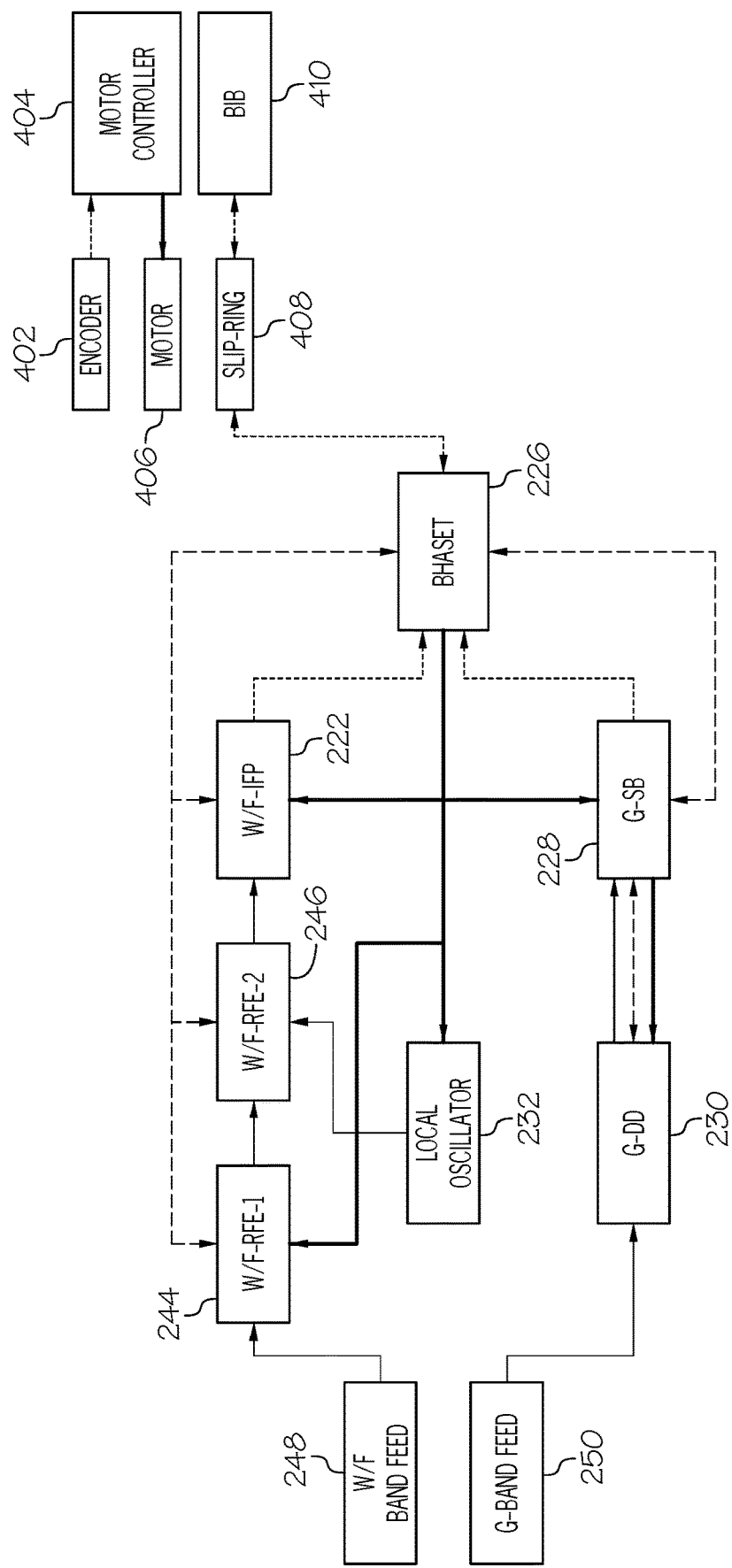
FIG. 5 shows a block diagram of example components of a radiometer and a scanner in accordance with the present disclosure.

FIG. 5 shows a block diagram of example components of a system having a radiometer and a scanner in accordance with the present disclosure. The system may include a first portion 244 of W/F RFE (W/F-RFE-1), a second portion 246 W/F RFE (W/F-RFE-2), W/F IFP 222, BHASET or C&DH board 226, GSB 228, G-DD 230, local oscillator 232 (which may be the same DRO 232), W/F Band feed 248, and G-Band feed 250. The various components shown in the system of FIG. 5 may be in electronic communication each other as shown by the arrows in FIG. 5.

Radiation may be first incident upon the antenna 234 of the radiometer. A parabolic reflector may focus the radiation energy to feedhorns positioned at the focal point of the paraboloid. A beam may be split between two feedhorns, for example, using a wire grid polarizing dichroic. The feedhorns may be connected to the receivers (e.g., W/F RFE and G-DD) by waveguide. A noise diode signal may be injected into, e.g., the W/F RFE, for calibration. The receivers may amplify the signal to facilitate the channelizing of the incoming signal, where the power may be divided into predefined spectral bands. A broadband filter bank may be used in the G-DD to provide four channels, and a narrowband filter bank is used in the W/F-IFP to provide eight channels. The output of the G-DD may include four analog signals, which may be converted to digital numbers by the G-SB or GSB. Digital signals from the W/F-IFP and G-SB may be passed to the BHASET (i.e., the C&DH) where they may be aggregated, packetized, and passed to the spacecraft bus via the slipring connector and the BIB (bus interface board).

The system may further include an encoder 402, motor controller 404, motor 406, slip ring 408, and bus interface board (BIB) 410. For example, the scanning mechanism or assembly may include of an optical encoder (e.g., encoder 402), a space-qualified slip ring (e.g., slip ring 408), a 28-pole brushless motor and controller (e.g., motor 406 and motor controller 404) and a back-to-back duplex pair bearing assembly. The scanner may be primarily composed from Ti-6Al-4V due to its close thermal expansion match to 440C stainless steel (SS) bearing races and 416 SS motor.

Figure 6:
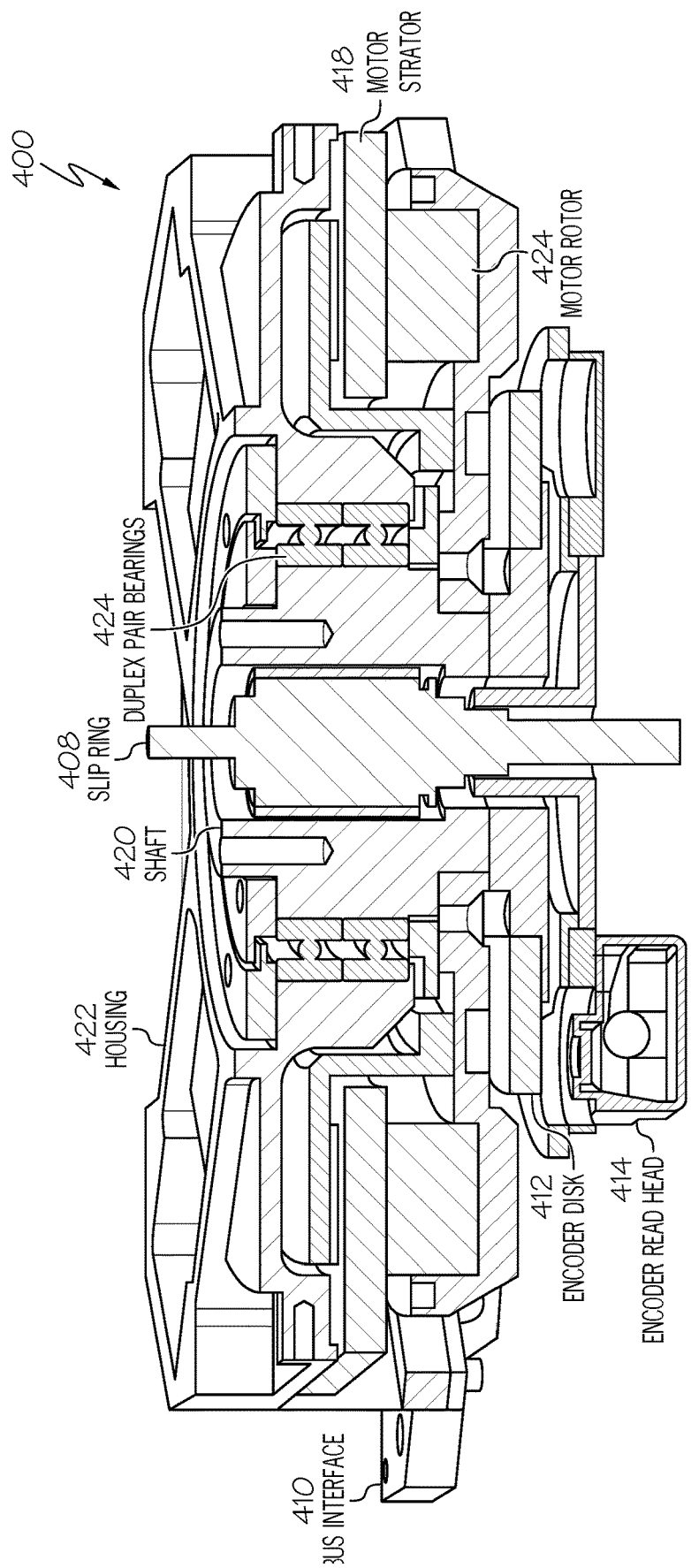
FIG. 6 depicts an example scanner in accordance with the present disclosure.

FIG. 6 depicts an example scanner 400 in accordance with the present disclosure. In general, cross-track sounders or scanners on satellites may use a rotating flat-plate reflector which may be the only moving part of the imaging system of the satellite. The receivers and supporting electronics for the cross-track sounders may all be fixed relative to the spacecraft or satellite bus. Using the techniques and features described in the present disclosure, the entire payload of the satellite may be rotated. This rotation may allow for a much higher integration between the antenna, receiver, and supporting electronics of the payload, thus allowing for miniaturization for compatibility with, for example, a CubeSat bus. The rotation of the entire payload may also allow for a larger antenna aperture per a given volume, which may allow for improvement in spatial resolution because a larger aperture may result in a narrower antenna beam. Thus, as will be described below, using the techniques and features described in the present disclosure, a cross-track scanning spaceborne radiometer may be implemented with a spinning payload.

The scanner 400 may be the primary mechanism between a bus (e.g., bus 102) and a payload (e.g., payload 106) on a satellite or CubeSat. Scanner 400 may allow for precision pointing, power transfer, and signal transfer. Scanner 400 may include a slip ring 408, a bus interface 410, an encoder disk 412, an encoder read head 414, a motor rotor 416, a motor stator 418, a shaft 420, a housing 422, and duplex pair bearings 424.

Commutation may be used to energize the motor stator 418 windings in a sequence, with one winding positive, one winding negative, and the third winding powered off. Torque production may be caused by the attraction and repulsion between the motor stator 418 field and permanent magnets of the motor rotor 416. Maximum torque may be achieved when the two fields are oriented at 90 degrees to each other, and torque may diminish as the fields align. Thus, in order to keep the motor turning, the stator's magnetic field should change position as the rotor field catches up with it.

In order to energize the proper stator winding, the rotor position should be known. Three Hall effect sensors may be used to monitor the rotor's position to permit, for example, a six-step commutation. When the rotor passes a sensor, it may produce either a high or a low signal to indicate which rotor pole (N or S) has passed. This switching of the three Hall effect sensors (from high to low or from low to high) may provide rotor position information, for example, every 60 degrees.

Figure 7:
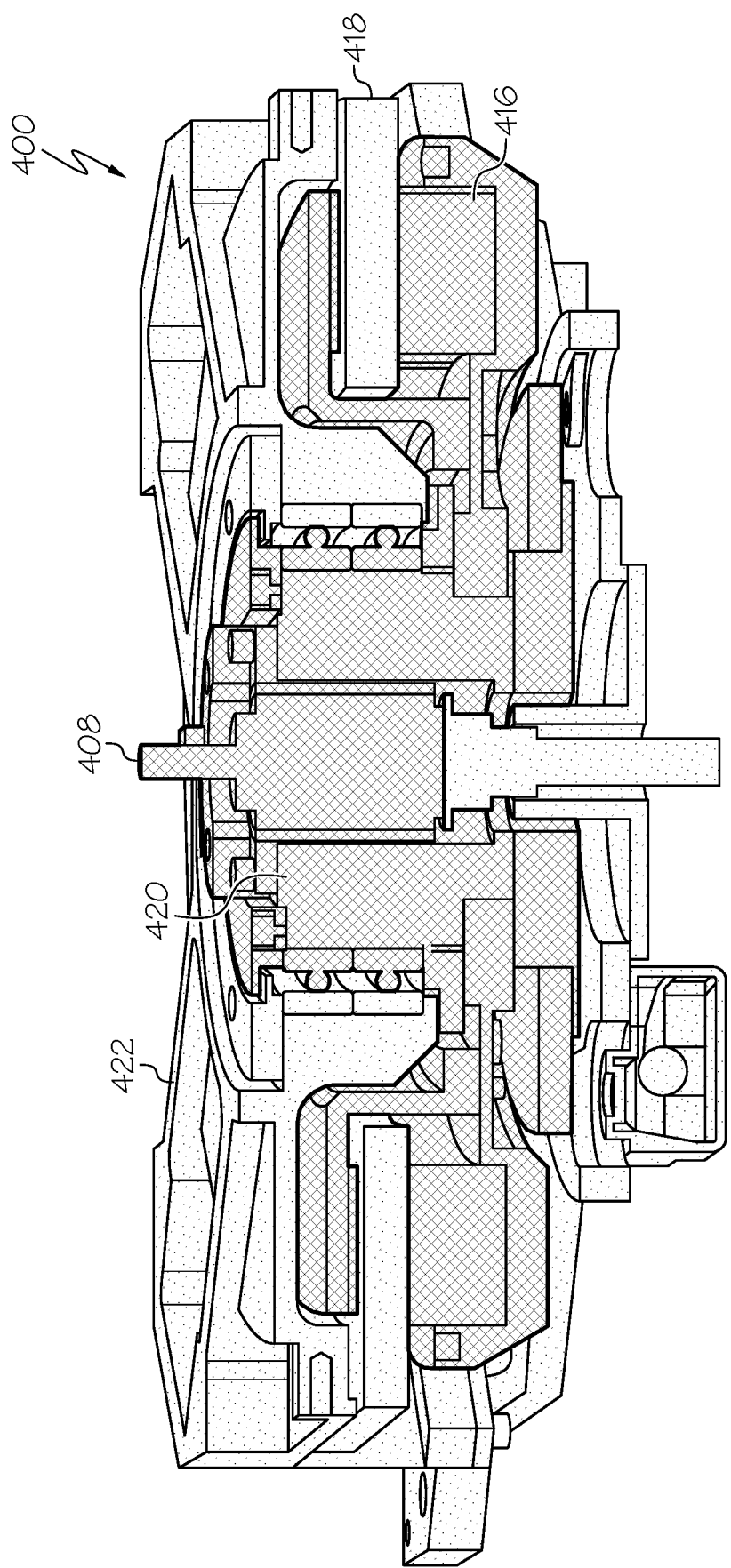
FIG. 7 also depicts an example scanner in accordance with the present disclosure.

FIG. 7 also depicts the example scanner 400 in accordance with the present disclosure. When scanner 400 is activated or in operation, the dark portions of scanner 400 remain stationary while the light portions of scanner 400 rotate. For example, when scanner 400 is activated or in operation, housing 422 and motor stator 418 remain stationary while motor rotor 416, a top portion of slip ring 408, and shaft 420 rotate.

As described above, the scanner assembly may provide satellites such as, for example, those using the CubeSat platform, with dual-spin functionality. The scanner assembly may produce a continuous torque of 250 mN-m while providing sub-arcminute angular position knowledge and may allow for 12 electrical signals between stationary and rotating hardware. Further, the scanner assembly may functionally operate in a vacuum environment and withstand temperatures in the range of −10 to +70 degrees Celsius.

Figure 8A:
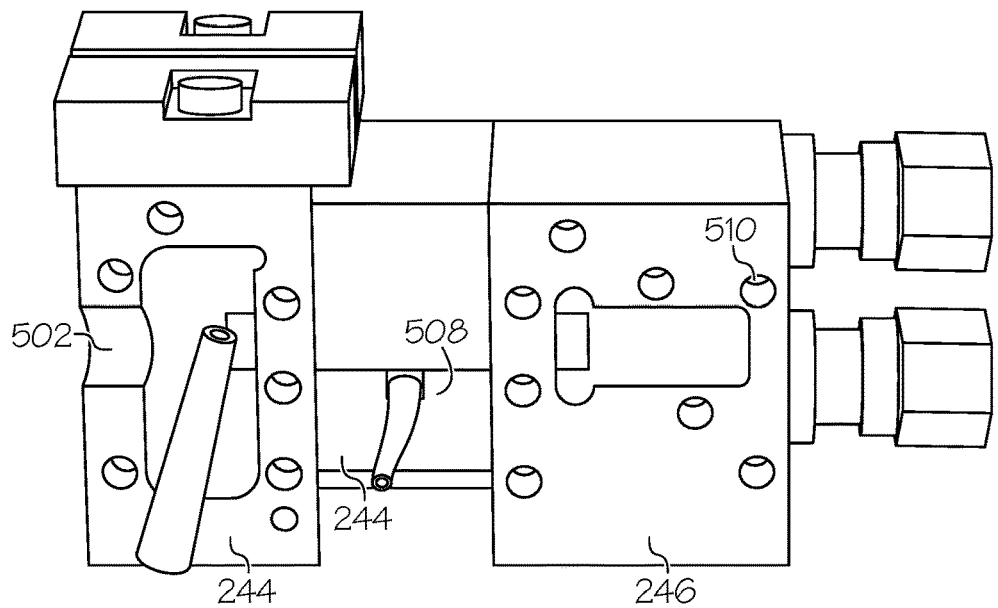
FIG. 8A shows example front end components of a W-Band and F-Band receiver in accordance with the present disclosure.

The radiometer (e.g., radiometer 200) may include a W-Band and F-Band receiver (e.g., W/F Band receiver 202). W/F Band receiver 202 may be operable in a frequency range of about 75 GHz to about 140 GHz. Referring now to FIG. 8A, example front end components of W/F Band receiver 202 in accordance with the present disclosure are shown. W/F Band receiver 202 may include a first portion 244 of W/F RFE (W/F-RFE-1), a second portion 246 W/F RFE (W/F-RFE-2). W/F-RFE-1 may include a noise injection block 502 and low noise amplifier 508. W/F-RFE-2 may include a mixer-amplifier 510 (e.g., a SiGe mixer amplifier).

Figure 8B:
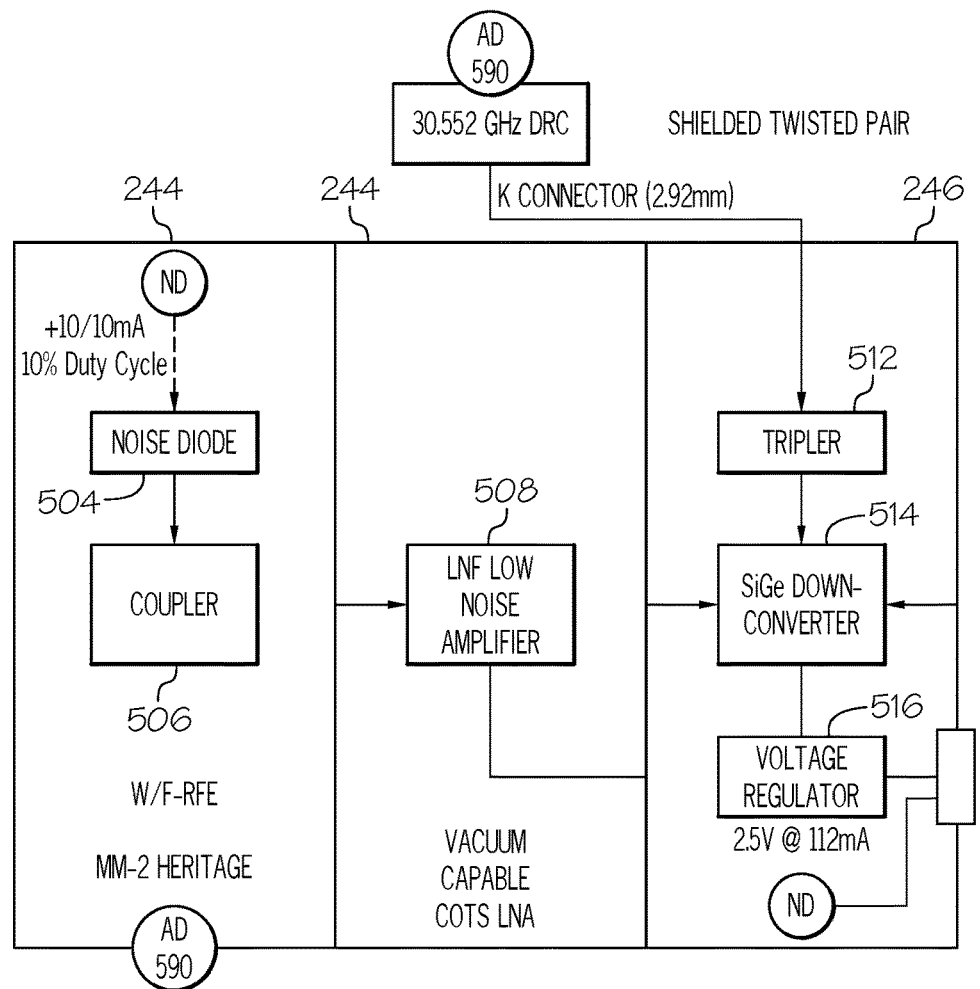
FIG. 8B shows a block diagram of example front end components of a W-Band and F-Band receiver in accordance with the present disclosure.

FIG. 8B shows a block diagram of example front end components of W/F Band receiver 202 in accordance with the present disclosure. As shown in FIG. 8B, W/F-RFE-1 may include a noise diode 504, a coupler 506, and a low noise amplifier 508. W/F-RFE-2 may include a tripler 512, a down-converter 514 (e.g., a SiGe down-converter), and voltage regulator 516. Tripler 512 may multiply a 30.552-GHz oscillator signal by a factor of three. Down-converter 512 may amplify an incoming signal from the low noise amplifier 508 and mix the signal with the tripled oscillator signal to produce an intermediate frequency signal, which may then be further amplified. Voltage regulator 516 may provide filtered and stable voltages to gates and drains of the down-converter 514.

The W/F RFE (i.e., W/F-RFE-1 and W/F-RFE-2) may have a reduced gain to prevent compression in cold temperatures (the gain increases as the temperature goes down. For example, a thermistor may be used in an amplifier bias circuit to change the bias to keep the amplifier gain constant with temperature change. Without this function, the amplifier gain may increase with decreasing temperature, which may lead to amplifier saturation at very low temperatures.

Some satellite-based imaging systems may use large, bulky calibration targets for calibration which may comprise a significant fraction of the overall volume and mass. Using the techniques and features of the present disclosure, a noise diode coupled into the receiver front end (e.g., W/F RFE) may be used to inject a precisely known noise power into the radiometer for calibration. The noise diode may be extremely small and may be directly integrated into the receiver module without increasing its size.

In an implementation, the W-Band and F-Band receiver may be configured to perform noise diode calibration using the noise injection block and noise diode. For example, a diode signal may be weakly coupled into the W/F RFE. A precision current source may bias the diode such that it produces a precisely known noise power that is coupled into the W/F RFE. The diode (e.g., noise diode 504) may be powered on and off as the radiometer (e.g., radiometer 200) scans across the (precisely known) cosmic background to produce two known calibration points (the cosmic background & the cosmic background plus noise diode). The diode may be mounted in the W/F Band receiver (e.g., W/F Band receiver 202) in such a way as to minimize the thermal time constant so the noise power equilibrates quickly. The diode bias current may be filtered to remove noise, but also optimized to avoid long electrical time constants.

The W-Band and F-Band receiver may be designed to produce an output voltage that is linearly proportional to the radiation incident upon the antenna. To convert voltage to radiation, two points may be needed (e.g., a hot point and a cold point). Some systems may use a bulky calibration target to provide a hot point. Using the techniques and features of the present disclosure, these two points may be obtained by measuring cold sky (i.e., known radiation intensity) and measuring cold sky plus the noise diode (i.e., also with known radiance intensity). These two points may be used to define a linear relationship between the receiver output voltage and input radiance intensity as measured by the radiometer. Observations of the sun and moon may be used to correct any drifts of the noise diode output noise power.

The radiometer may further include an intermediate frequency processor. Some satellite-based imaging systems may use individual components connected together by coaxial cables with bulky connectors to facilitate processing. These individual components may be mounted on a large plate and housed in large box. Using the techniques and features described in the present disclosure, processing components (e.g., power dividers, amplifiers, filters, detectors, video frequency amplifiers, and analog-to-digital converters) may be integrated on the same circuit board. This high level of integration may allow the entire processing package to be miniaturized by a factor between 10 and 100. Electromagnetic software analysis tools may permit design of this integrated architecture by modeling channel crosstalk and amplifier stability over very large bandwidth (DC to 40 GHz).

Figure 9:
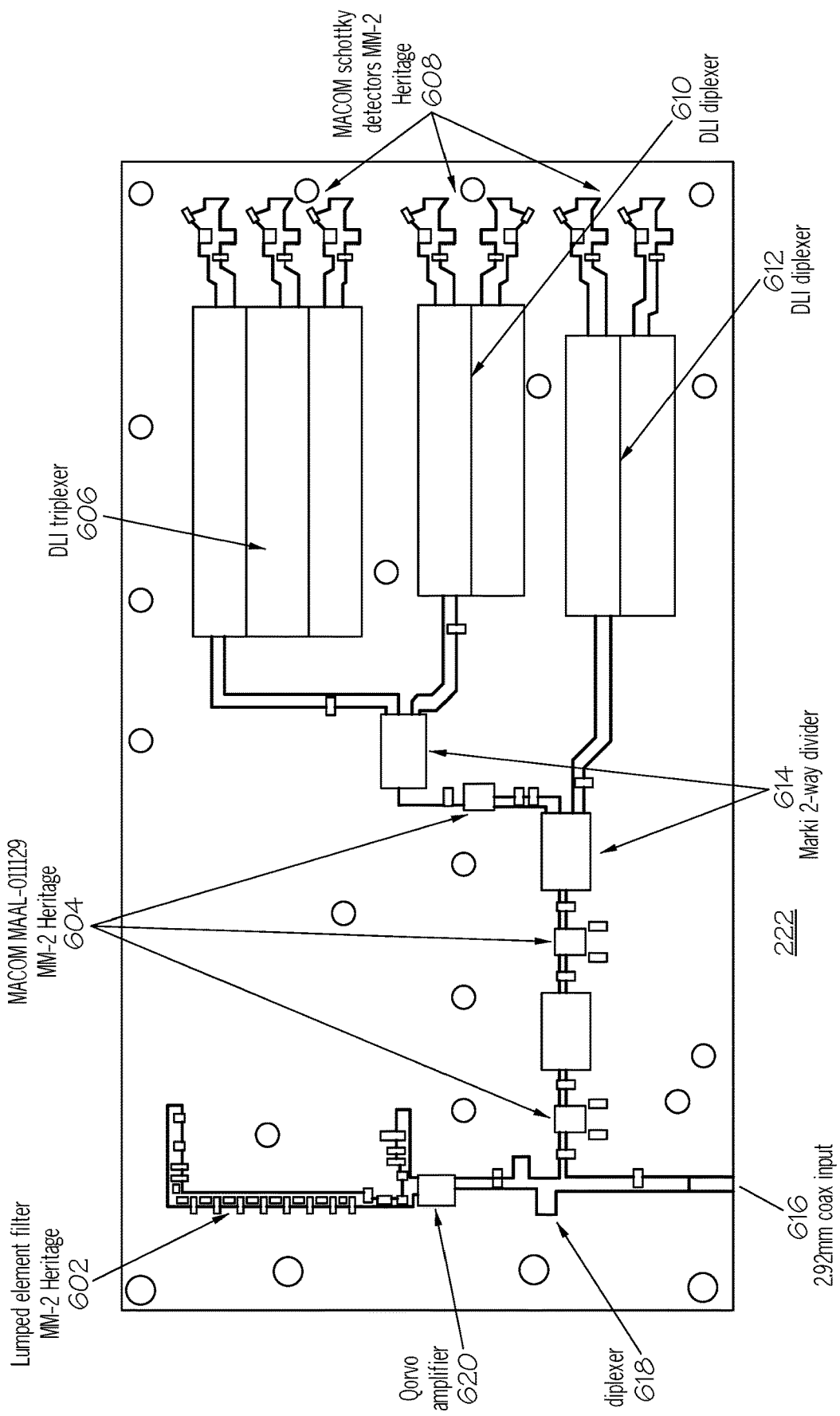
FIG. 9 shows an RF electronics side of an example intermediate frequency processor in accordance with the present disclosure.

The intermediate frequency processor (W/F-IFP) described herein may be operable in a frequency range of about 0 GHz to about 28 GHz. Referring now to FIG. 9, an RF electronics side of an example intermediate frequency processor (e.g., IFP 222) in accordance with the present disclosure is shown. IFP 222 may include element filter 602, passband filter 604 (e.g., for the single W-band channel, triplexer 606, detectors 608, diplexers 610, 612, and 618, divider 614, coax input 616, and amplifier 620. The input to the W/F-IFP may be the output from the WF-RFE (i.e., an IF signal from the mixer after amplification). Generally, the input power may be amplified and divided into multiple paths. Each of these paths may then be filtered (with, e.g., a different center frequency and bandwidth) and amplified further. The input power in each path may be detected by a square-law device, which may provide a voltage that is proportional to power which is proportional to radiance intensity.

Figure 10:
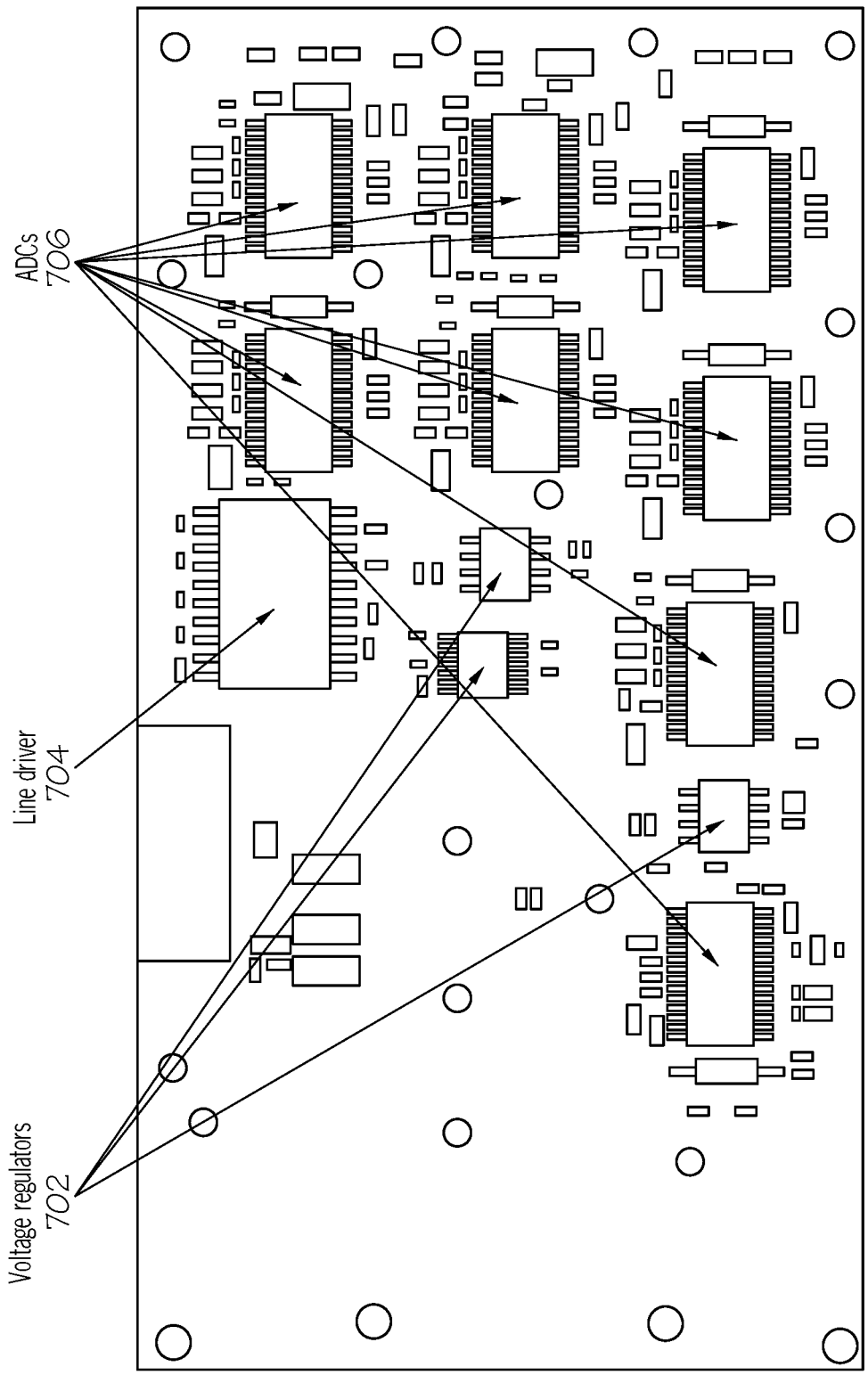
FIG. 10 shows an analog/digital electronics side of an example intermediate frequency processor in accordance with the present disclosure.
Figure 11:
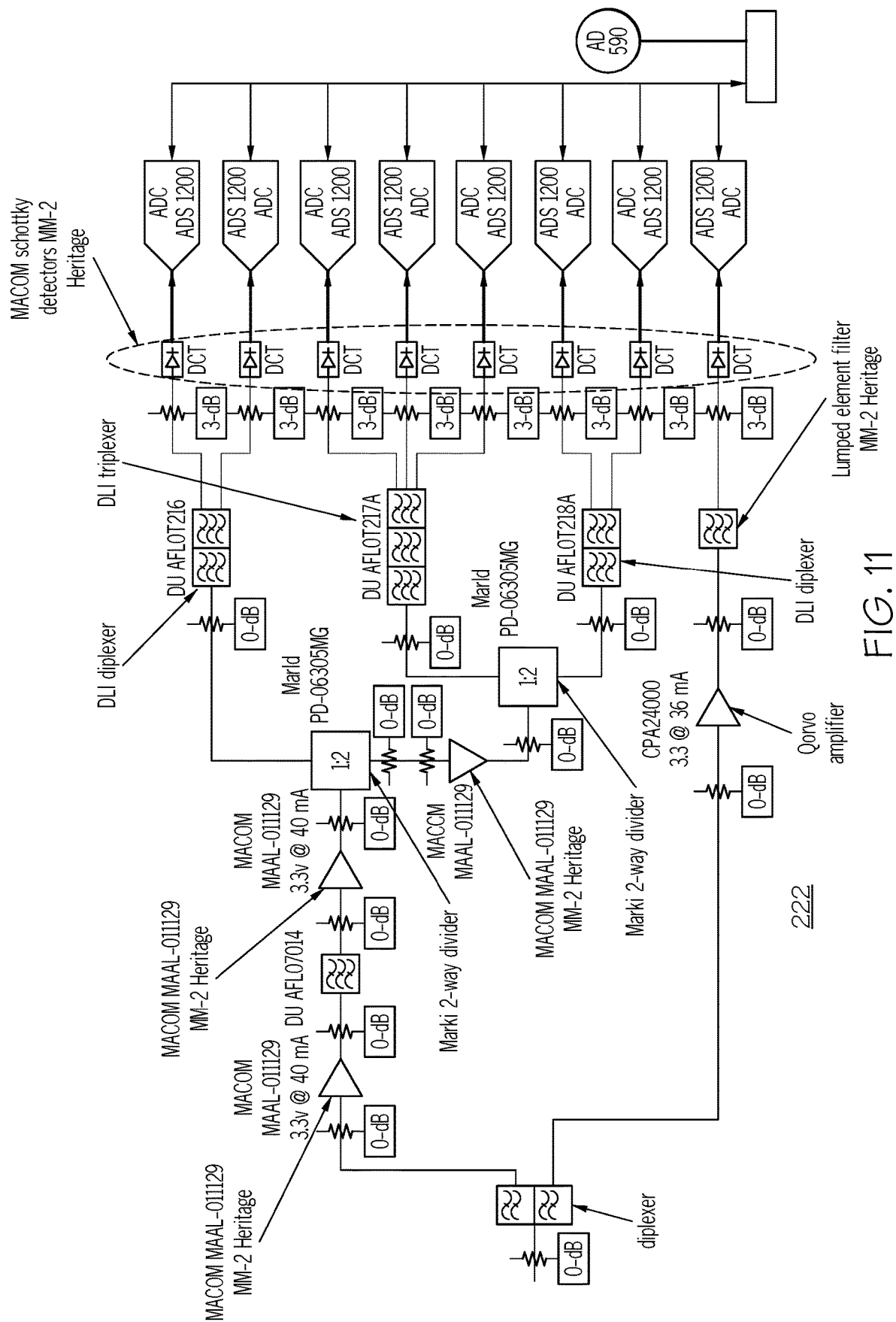
FIG. 11 shows a block diagram of an example intermediate frequency processor in accordance with the present disclosure.

FIG. 10 shows an analog/digital electronics side of an example intermediate frequency processor in accordance with the present disclosure. FIG. 11 shows a block diagram of an example intermediate frequency processor in accordance with the present disclosure. A detected voltage in each path may be converted to a digital number via analog-to-digital converters (ADCs) 706. The temperature of the W/F-IFP module may be measured by a temperature sensor (e.g., an AD590 temperature sensor) and relayed to the BHASET/C&DH board and then to the spacecraft bus. The IFP may include voltage regulators 702 and line driver 704.

The radiometer may further include a G-Band direct detect component operable from about 183 GHz to 206 GHz. The G-band direct detect component may be a receiver that does not use a mixer. Instead, waveguide cavity filters may be used to provide each of the four channels in the G-Band. This may save DC power, volume, and mass over a G-Band receiver because a local oscillator source may not be needed.

Figure 12:
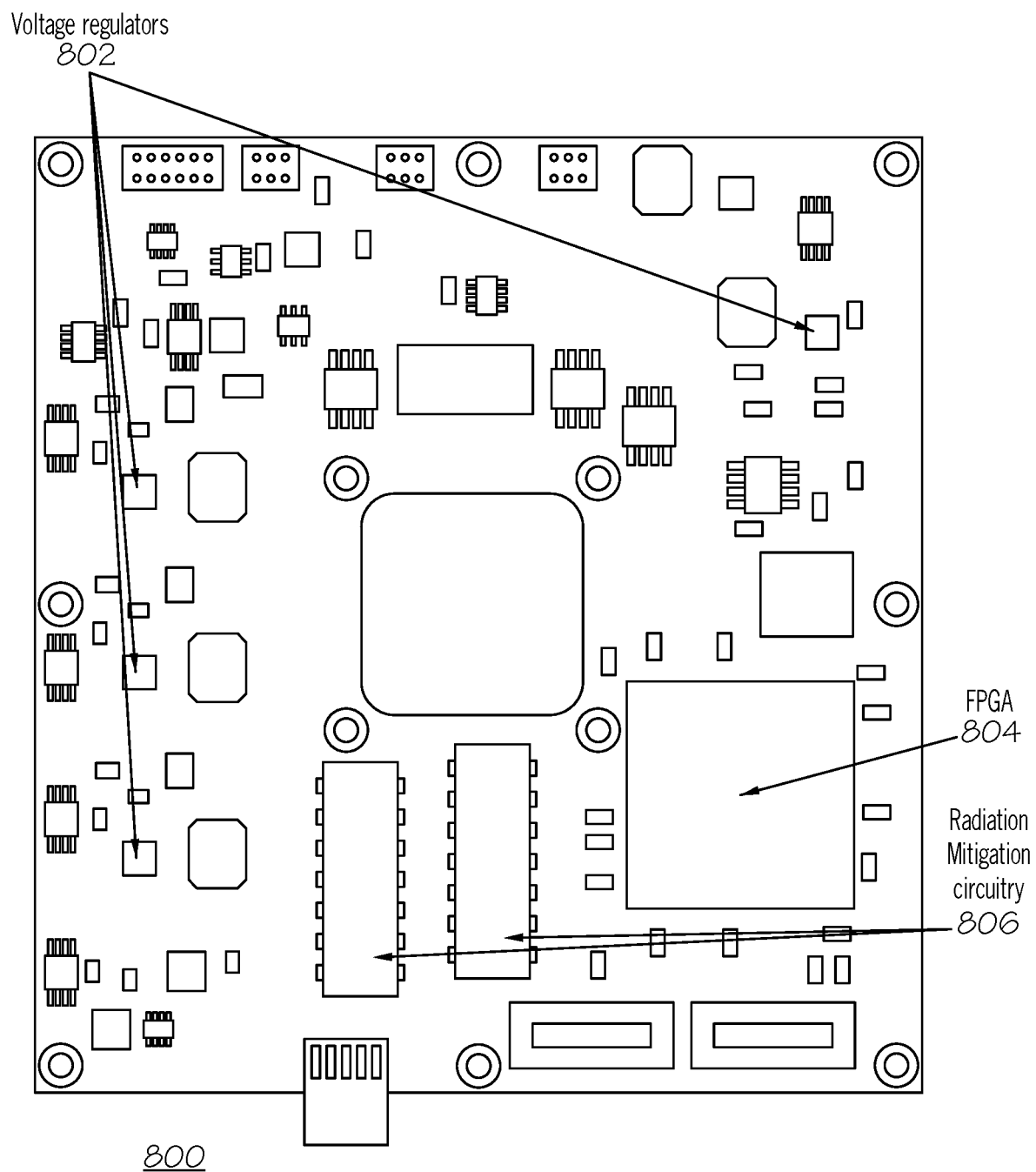
FIG. 12 shows a command and data handling component of an example radiometer in accordance with the present disclosure.
Figure 13:
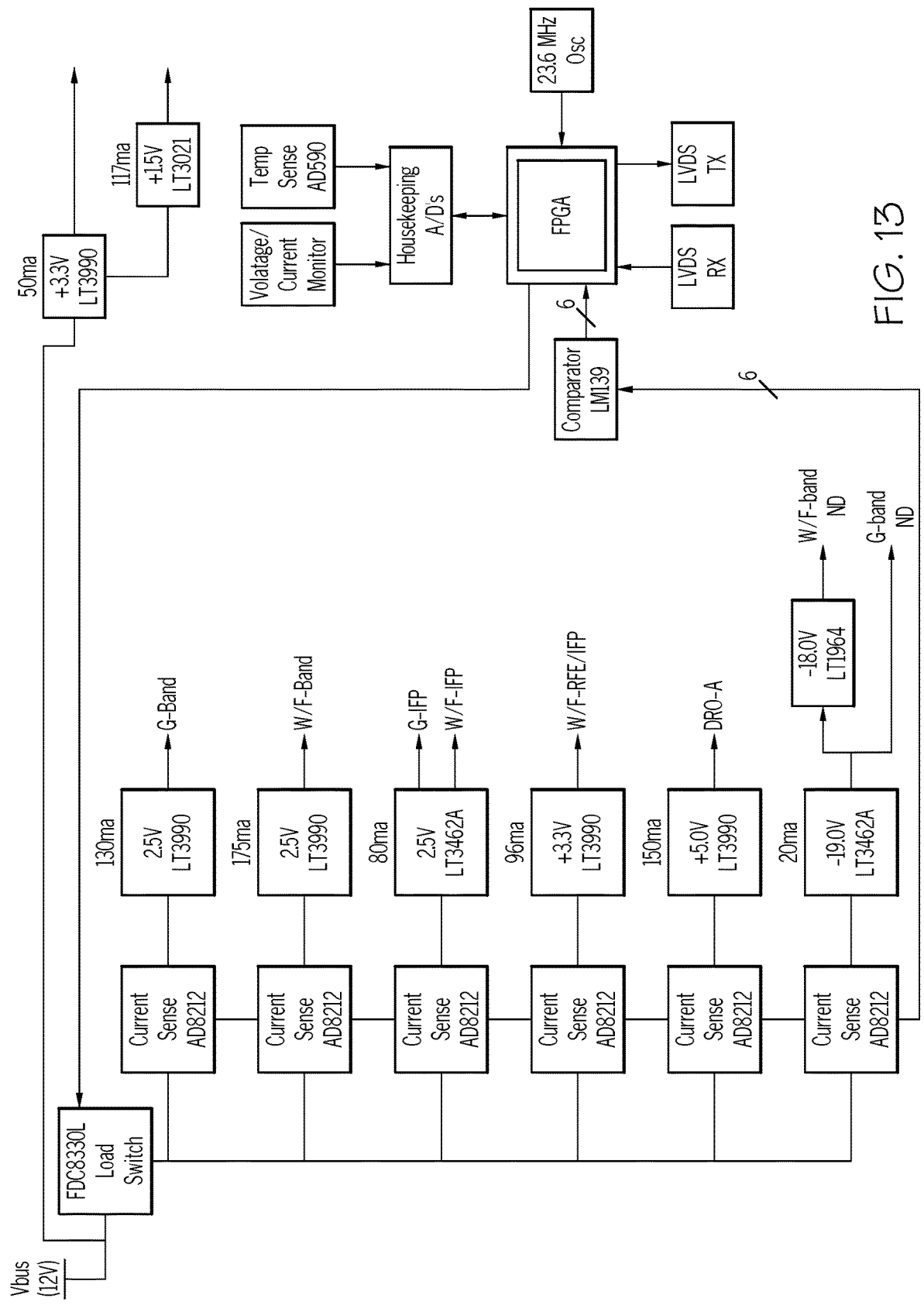
FIG. 13 shows a block diagram of an example command and data handling component in accordance with the present disclosure.

FIG. 12 shows a command and data handling component of an example radiometer in accordance with the present disclosure. FIG. 13 shows a block diagram of an example command and data handling (C&DH) component in accordance with the present disclosure. The C&DH component 800 may include Voltage regulators 802 which may be used to convert a 12V signal provided by the spacecraft bus to voltages needed by the various payload components. A precision current bias needed for the noise diode may also be produced. Protection circuitry may be used to provide tolerance from radiation induced upset events by immediately disconnecting the power supply if a short circuit is detected. The FPGA 804 may control sampling of the ADCs and may coordinate aggregation and packetizing of all the digital data from the receivers and temperature/voltage/current sensors. The C&DH component 800 may also include radiation mitigation circuitry 806.

In various implementations, the system and/or radiometer may further include one or more of a beam focusing antenna (e.g., antenna 234), a data interfacing board (e.g., BIB 410), a local oscillator (e.g., local oscillator 232), a thermal regulation system (e.g., survival heater 216 and heater thermal switch 218 among other components), and one or more cables and waveguides.

Figure 14:
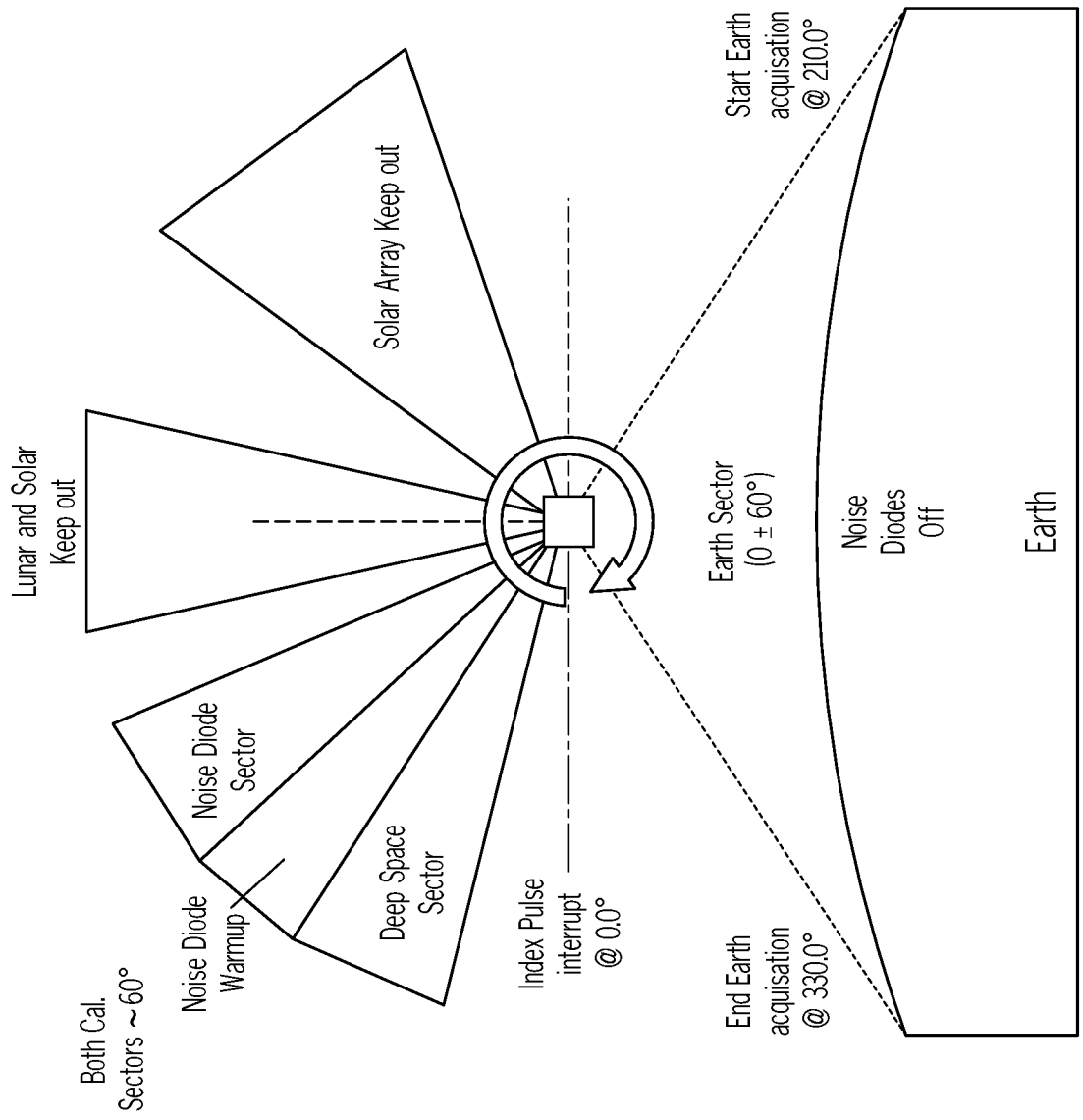
FIG. 14 depicts an example scan profile of a radiometer in accordance with the present disclosure.

FIG. 14 depicts an example scan profile of a radiometer in accordance with the present disclosure. Various operating modes of the radiometer may be shown. When viewing the Earth for approximately one third of the scan, the radiometer may be collecting data over approximately 80 spots. Away from the Earth, the cosmic background may be measured (e.g., calibration point 1), and the noise diode may be turned on and allowed to thermally and electrically equilibrate ("noise diode warmup"). Then the cosmic background plus noise diode (e.g., calibration point 2) may be measured. The cosmic background may only be measured when none of the following is in the field of view: sun, moon, and solar array. This cycle may be repeated once every two seconds.

In an implementation of the present disclosure, a plurality of or constellation of satellites such as CubeSats which incorporate one or more of the systems and methods described in the present disclosure may be deployed and used to provide weather data.

While the invention has been shown and described with reference to specific embodiments, it should be understood by those skilled in the art that various changes in form and detail may be made therein without departing from the scope of the invention.

What is claimed is:

1. A system comprising:
   a scanner assembly; and
   a radiometer comprising:
      a W-Band and F-Band receiver comprising:
         a first portion comprising;
            a noise diode;
            a coupler; and
            a low noise amplifier;
         a second portion comprising:
            a tripler configured to triple an oscillator signal;
            a downconverter; and
            a voltage regulator; and
         a thermistor in an amplifier bias circuit configured to change a bias to maintain an amplifier gain constant with a temperature change, the thermistor and amplifier bias circuit being included in at least one of the first portion and the second portion,
         wherein the downconverter is configured to amplify an incoming signal from the low noise amplifier and mix the tripled oscillator signal to produce an intermediate frequency signal; and
      an intermediate frequency processor.

2. The system of claim 1, wherein the system is rotatably mounted to a bus via the scanner assembly.

3. The system of claim 1, wherein the scanner assembly further comprises a motor and a slipring.

4. The system of claim 1, wherein the W-Band and F-Band receiver is operable in a frequency range of 75 GHz to 140 GHz.

5. The system of claim 1, wherein the intermediate frequency processor is operable in a frequency range of 0 GHz to 28 GHz.

6. The system of claim 1, wherein the W-Band and F-Band receiver further comprises a noise diode.

7. The system of claim 1, wherein the W-Band and F-Band receiver further comprises a noise diode injection block.

8. The system of claim 1, wherein the W-Band and F-Band receiver is configured to perform noise diode calibration.

9. The system of claim 1, wherein the radiometer further comprises a G-Band direct detect component operable from 183 GHz to 206 GHz.

10. The system of claim 1 further comprising at least one of: a command and data handling board, a beam focusing antenna, a data interfacing board, a local oscillator, a thermal regulation system, and one or more cables and waveguides.

11. The system of claim 1, wherein the system is a payload component of a satellite.

12. The system of claim 2, wherein the satellite is a CubeSat.

13. The system of claim 9, wherein the G-Band direct detect component comprises a noise diode.

14. A W-Band and F-Band receiver comprising:
   a first portion comprising;
      a noise diode;
      a coupler; and
      a low noise amplifier;
   a second portion comprising:
      a tripler configured to triple an oscillator signal;
      a downconverter;
      and a voltage regulator; and
   a thermistor in an amplifier bias circuit configured to change a bias to maintain an amplifier gain constant with a temperature change, the thermistor and amplifier bias circuit being included in at least one of the first portion and the second portion,
   wherein the downconverter is configured to amplify an incoming signal from the low noise amplifier and mix the tripled oscillator signal to produce an intermediate frequency signal.

* * * * *